US006804392B1

United States Patent
Adams, Jr. et al.

(10) Patent No.: US 6,804,392 B1
(45) Date of Patent: Oct. 12, 2004

(54) REMOVING COLOR ALIASING ARTIFACTS FROM COLOR DIGITAL IMAGES

(75) Inventors: James E. Adams, Jr., Rochester, NY (US); John F. Hamilton, Jr., Rochester, NY (US); James A. Hamilton, State College, PA (US)

(73) Assignee: Eastman Kodak Company, Rochester, NY (US)

( * ) Notice: Subject to any disclaimer, the term of this patent is extended or adjusted under 35 U.S.C. 154(b) by 809 days.

(21) Appl. No.: 09/688,894

(22) Filed: Oct. 16, 2000

(51) Int. Cl.[7] .................................................. G06K 9/00
(52) U.S. Cl. ...................... 382/167; 382/266; 382/269; 382/275; 358/518; 345/611; 345/616
(58) Field of Search ................................ 382/167, 252, 382/255, 266, 269, 274, 275; 358/3.26, 3.27, 518, 525; 345/606, 616, 618, 647, 611

(56) References Cited

U.S. PATENT DOCUMENTS

| 4,803,548 A | * | 2/1989 | Kirk ........................... 348/630 |
| 5,729,360 A | * | 3/1998 | Kita et al. ................... 358/500 |
| 6,191,827 B1 | * | 2/2001 | Segman et al. ............. 348/746 |
| 6,229,578 B1 | * | 5/2001 | Acharya et al. ............ 348/607 |
| 6,266,817 B1 | * | 7/2001 | Chaddha ..................... 725/146 |

* cited by examiner

Primary Examiner—Bhavesh M. Mehta
Assistant Examiner—Yosef Kassa
(74) Attorney, Agent, or Firm—Raymond L. Owens

(57) ABSTRACT

A method of minimizing color aliasing artifacts from a color digital image having color pixels is disclosed. The method includes providing luminance and chrominance signals from the color digital image; using the luminance and chrominance signals to compute neighborhoods of pixels which are to be processed and wherein such neighborhoods of pixels are substantially bounded by pixels defining edges; producing low frequency chrominance signals in response to the chrominance signals; using the low frequency chrominance signals and the computed neighborhood of pixels to produce noise-cleaned chrominance signals; upsampling the noise-cleaned chrominance signals to produce upsampled noise-cleaned chrominance signals; and using the luminance signals and the upsampled noise-cleaned chrominance signals to provide a color digital image having reduced color aliasing artifacts.

4 Claims, 4 Drawing Sheets

REMOVING COLOR ALIASING ARTIFACTS FROM COLOR DIGITAL IMAGES

CROSS REFERECE TO RELATED APPLICATION

Reference is made to commonly-assigned U.S. patent application Ser. No. 09/391,870 filed Sep. 8, 1999 entitled "Removing Color Moire Patterns From Digital Images Having Known Chromaticities" by James E. Adams, Jr. et al., the disclosure of which is incorporated herein.

FIELD OF THE INVENTION

The present invention relates to minimizing aliasing artifacts in colored digital images.

BACKGROUND OF THE INVENTION

One type of noise found in color digital camera images appears as low frequency, highly colored patterns in regions of high spatial frequency, e.g., tweed patterns in clothing. These patterns, called color moire patterns or, simply, color moire, produce large, slowly varying colored wavy patterns in an otherwise spatially busy region. Color moire patterns are also referred to as chrominance aliasing patterns, or, simply, chrominance aliasing.

There are numerous ways in the prior art for reducing color moire patterns in digital images. Among these are numerous patents that describe color moire pattern reduction methods using optical blur filters in digital cameras to avoid aliasing induced color moire in the first place. However, these blur filters also blur genuine spatial detail in the image that may not be recoverable by subsequent image processing methods.

Some approaches deal specifically with digital image processing methods for reducing or removing chrominance noise artifacts. One class of digital camera patents discloses improvements to the color filter array (CFA) interpolation operation to reduce or eliminate high frequency chrominance noise artifacts. Another class of patents teach using different pixel shapes (i.e., rectangles instead of squares) and arrangements (e.g., each row is offset by half a pixel width from the preceding row) with accompanying CFA interpolation operations to reduce or eliminate chrominance noise artifacts. However, these techniques address only high frequency chrominance noise, and are generally ineffective against low frequency color moire.

There is the well known technique in the open literature of taking a digital image with chrominance noise artifacts, converting the image to a luminance—chrominance space, such as CIELAB (CIE International Standard), blurring the chrominance channels and then converting the image back to the original color space. This operation is a standard technique used to combat chrominance noise. One liability with this approach is that there is no discrimination during the blurring step between chrominance noise artifacts and genuine chrominance scene detail. Consequently, sharp colored edges in the image begin to bleed color as the blurring become more aggressive. Usually, the color bleed has become unacceptable before most of the low frequency color moire is removed from the image. Also, if any subsequent image processing is performed on the image, there is the possibility of amplifying the visibility of the color bleeding. A second liability of this approach is that a small, fixed blur kernel is almost required to try to contain the problem of color bleeding. However, to address low frequency color moire, large blur kernels would be needed to achieve the desired noise cleaning.

SUMMARY OF THE INVENTION

It is an object of the present invention to provide an effective method for minimizing aliasing artifacts in color digital images.

This object is achieved in a method of minimizing color aliasing artifacts from a color digital image having color pixels comprising the steps of:

(a) providing luminance and chrominance signals from the color digital image;

(b) using the luminance and chrominance signals to compute neighborhoods of pixels which are to be processed and wherein such neighborhoods of pixels are substantially bounded by pixels defining edges;

(c) producing low frequency chrominance signals in response to the chrominance signals;

(d) using the low frequency chrominance signals and the computed neighborhood of pixels to produce noise-cleaned chrominance signals;

(e) upsampling the noise-cleaned chrominance signals to produce upsampled noise-cleaned chrominance signals; and (f) using the luminance signals and the upsampled noise-cleaned chrominance signals to provide a color digital image having reduced color aliasing artifacts.

It is an advantage of the present invention that luminance and chrominance signals are used which not only reduce aliasing artifacts but also produce noise-cleaned chrominance signals.

Other advantages include:

Computation time is significantly reduced due to reduced number of total computations.

Highly aggressive noise cleaning with large effective neighborhoods can be performed without required large portions of the image to be resident in computer memory.

Edge detail in the image is protected and preserved during processing.

The invention is not sensitive to the initial color space representation of the image, i.e., it works equally well on RGB, CMY, CMYG, or other color spaces used to define images.

DETAILED DESCRIPTION OF THE INVENTION

Figure 1:
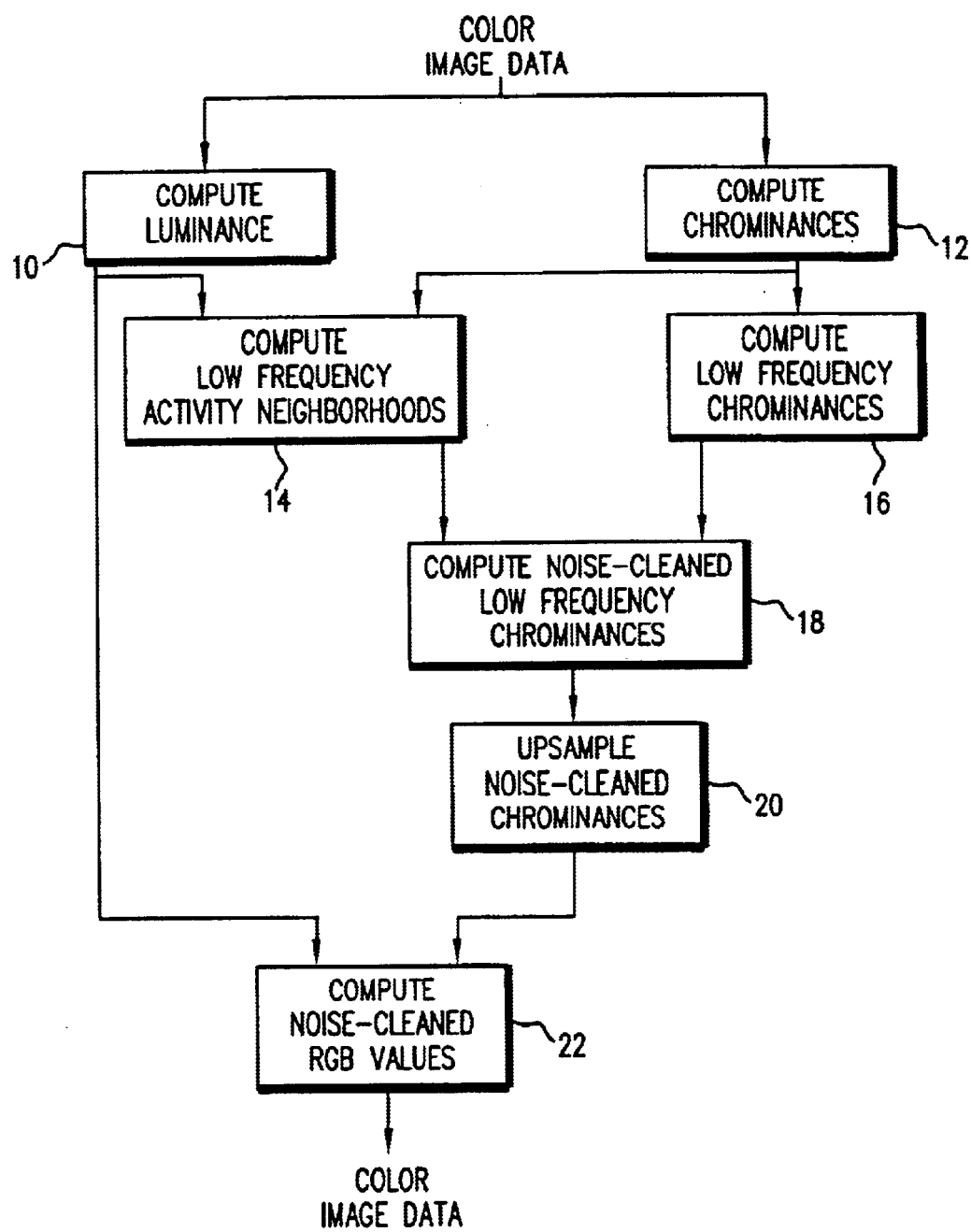
FIG. 1 is block diagram which illustrates a preferred method in accordance with the present invention.

Referring now to FIG. 1, Block 10 depicts the computation of luminance values from color digital image data which can be RGB image data. A suitable conversion would be:

$$L = (R + 2*G + B)/4$$

Block 12 depicts the computations of chrominance values from RGB image data. A suitable conversion would be:

$$C_1 = (-R + 2*G - B)/4$$

$$C_2 = (-R + B)/2$$

The computation of luminance and chrominance values from a color digital image is well-known to those skilled in the art and such computation need not be described further here.

Block 14 depicts the computation of neighborhoods of pixels which are to be processed and wherein such neighborhoods of pixels will substantially exclude pixels defining edges. This computation determines low frequency activity neighborhoods. Once such neighborhood is generated for each pixel location in the 3× downsampled image plane, and the neighborhood is used by both chrominance planes. An activity neighborhood is represented as a multiplicity of directional activity neighborhoods (a typical number is 8). Block 14 is further depicted in FIG. 2 as a sequence of four steps.

Block 16 depicts the computation of low frequency chrominances. An effective method is to tessellate each chrominance data plane with squares having three pixels on a side. A 3× downsampling of each chrominance data plane is then accomplished by replacing the nine pixels in each square with a single pixel having, as its value, a weighted average of the nine chrominance values. A typical choice for the matrix of weights is:

```
1 2 1
2 4 2
1 2 1
```

In FIG. 1, Block 18 depicts the production of noise-cleaned low frequency chrominance signals in accordance with the present invention. For each pixel in each of the low frequency chrominance data planes, the low frequency chrominance values within the low frequency activity neighborhood are combined to produce a noise-cleaned low frequency chrominance value. Block 18 is further depicted in FIG. 3 as a sequence of three steps.

Block 20 depicts the upsampling of noise-cleaned chrominance values. Each noise-cleaned low frequency chrominance data plane is upsampled 3× using bilinear interpolation. These noise-cleaned chrominance data planes and the luminance data plane from Block 10 all have the same dimensions.

Block 22 (FIG. 1) depicts the conversion of luminance and noise-cleaned chrominances into noise-cleaned RGB image data, using the inverse of the transformations performed in Block 10 and Block 12:

$$R = L - C_1 C_2$$

$$G = L + C_1$$

$$B = L - C_1 + C_2$$

Figure 2:
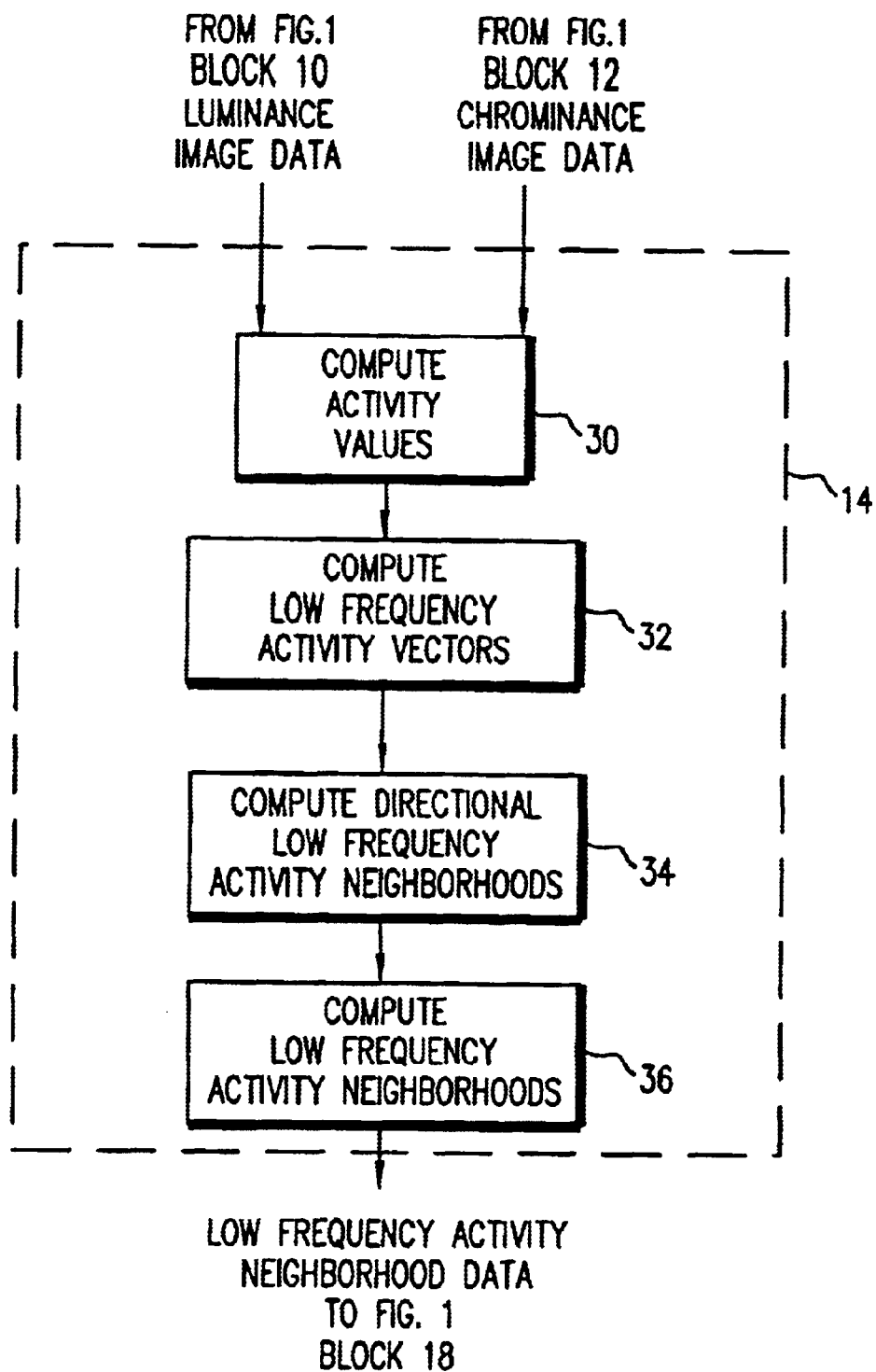
FIG. 2 is block diagram showing Block 14 in FIG. 1 in more detail.
Figures 4A, 4B, 5:
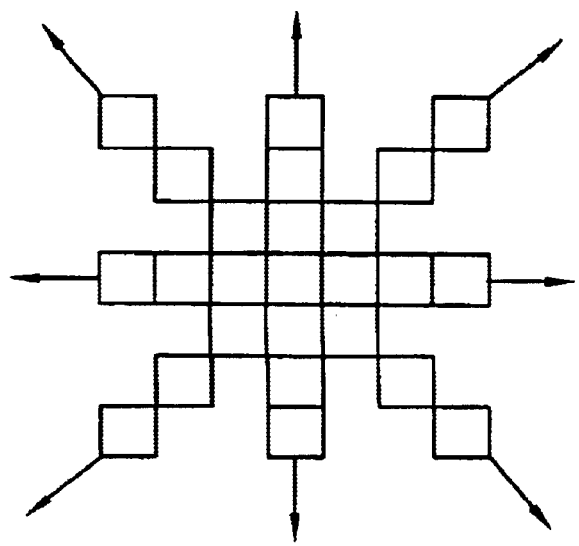
FIGS. 4a and 4b respectively depict two low frequency edge detection kernels used in Block 14 of FIG. 1.
FIG. 5 depicts as shown by the arrows directions that can be taken in determining neighborhood of pixels to be processed which are produced in Block 14 and used in Block 18 of FIG. 1.

Referring now to FIG. 2, where Block 14 is shown in greater detail, Block 30 depicts the computation of activity values. In this example, edge information is used to bound a computed neighborhood of pixels. For each pixel there is an activity value that depends on nearby luminance and chrominance values. For each of the three data planes, a horizontal and vertical activity value is computed by taking weighted sums of data. The horizontal and vertical weight kernels are shown in FIGS. 4a and 4b, respectively. The absolute values of the resulting six values are added together and the result is the activity value of the current pixel. It will be appreciated by those skilled in the art, that FIGS. 4a and 4b are low frequency edge detection kernels that are used in Block 30 for computing activity values.

In FIG. 2, Block 32 depicts the computation of low frequency activity vectors. The process begins by tessellating the activity value data plane with squares having three pixels on a side. For each 3×3 square, an activity vector is created having three components. The first component is the activity value found in the center of the 3×3 square. The second component is the second smallest of the nine activity values found in the 3×3 square. The third component is the second largest of the nine activity values found in the 3×3 square. The three components of the low frequency activity vectors can be considered to be trend numbers. These trend numbers are used in Block 34 to determine the neighborhood of pixels. In this example a desired characteristic of the neighborhood of pixels is that they are bounded by edges. As will be explained, other image characteristics can also be used in accordance with the present invention to bound a neighborhood of pixels. More particularly, the trend numbers are used to define the maximum number of pixels in a plurality of directions from the pixel of interest. This results in determination of the neighborhood of pixels which includes the maximum number of pixels identified. This is shown in FIG. 5.

Block 34 depicts the computation of directional low frequency activity neighborhoods. The depicted preferred embodiment utilizes 8 directions as depicted in FIG. 5, although it is understood that a different number of directions might be used instead. For any selected pixel, let $A_0$ denote the first component of its activity vector. From the selected pixel, 8 directional low frequency activity neighborhoods are generated as follows. Beginning at the selected pixel and proceeding in a particular direction, inspect the next pixel and let $A_{lo}$ and $A_{hi}$ denote the second and third components of its activity vector, respectively. If both absolute values, $ABS(A_0 - A_{lo})$ and $ABS(A_0 - A_{hi})$, are less than or equal to a preset threshold T (e.g. 60 for a 12-bit image), then this pixel is accepted as a member of the directional low frequency activity neighborhood and the process continues with the next pixel in the same direction.

If either absolute value exceeds T, the pixel is rejected and the process for that particular direction stops. The process is also stopped when the neighborhood reaches a preset maximum number of members (e.g. 10 pixels). Because directional low frequency activity neighborhoods do not include the original selected pixel, it is possible for them to be empty.

Finally, Block 36 of FIG. 2 depicts the computation of low frequency activity neighborhoods. The selected pixel together with all of the directional low frequency activity neighborhoods comprise the low frequency activity neighborhood of the selected pixel.

Block 14 is particularly suitable for use in ensuring that the neighborhood of pixels do not include edges. Neighborhood of pixels can not only be based upon excluding edges but also can be used so as only to include key colors such as flesh, sky, foliage and grass. Moreover, the neighborhood of pixels can be used to include only texture and untextured regions such as clothing, hair and masonry work or highlights and shadows. Still further, other special objects of interest such as human faces, automotive vehicles and text can be used.

Figure 3:
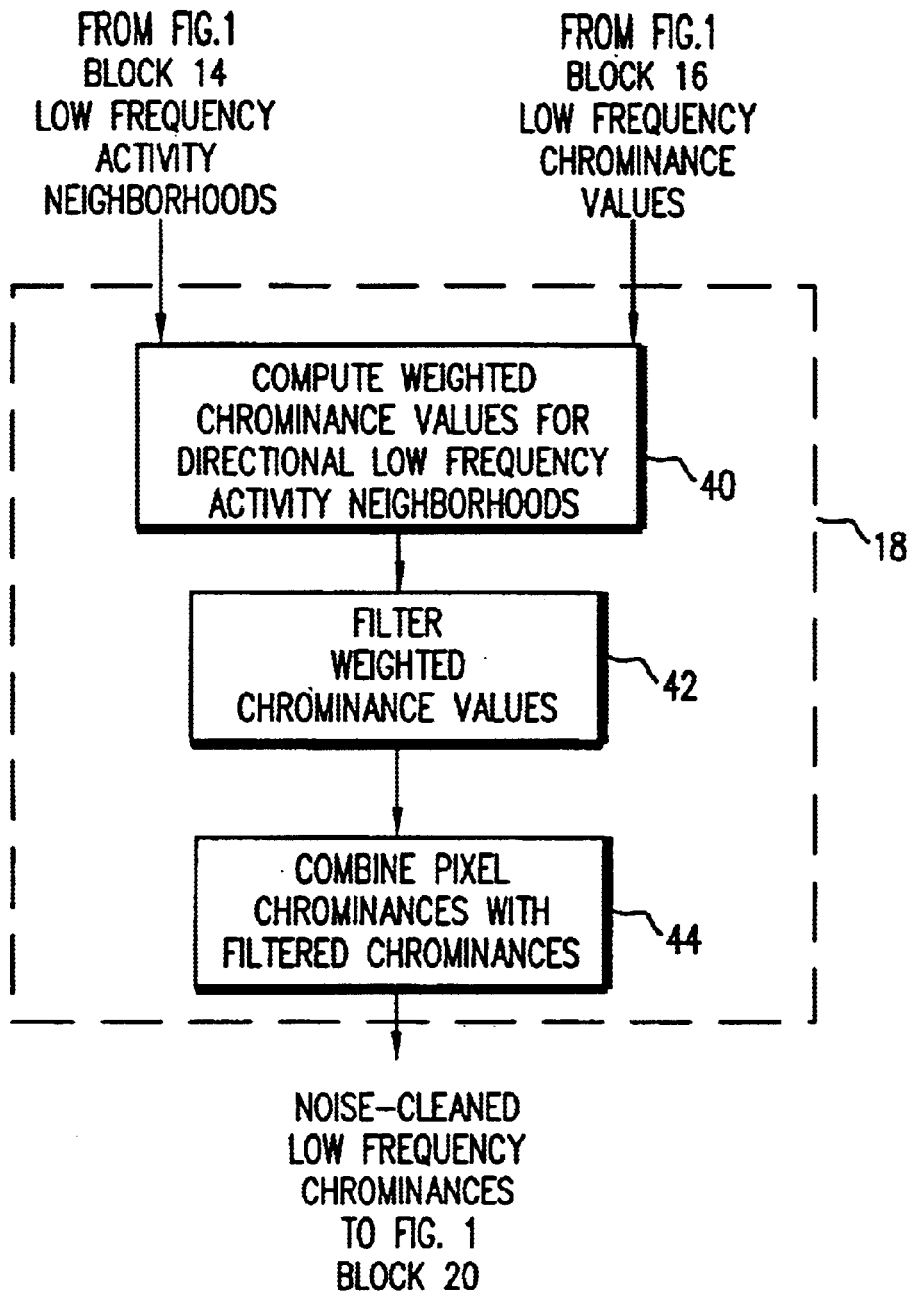
FIG. 3 is block diagram showing Block 18 in FIG. 1 in more detail.

Referring now to FIG. 3, Block 40 depicts the computation of weighted chrominance values for the directional low frequency activity neighborhoods. For each direction, consider the pixels in the corresponding activity neighborhood. Each pixel has a low frequency chrominance value which is multiplied by a weight which is determined by the pixel's position in the neighborhood. If Cjk is the kth chrominance value in the jth directional activity neighborhood, and if Wk is the weight corresponding to the kth position, then Cj is the weighted average chrominance value for the jth directional activity neighborhood, and its value is computed according to:

$$Cj = \left(\sum_k CjkWk\right) / \left(\sum_k Wk\right)$$

A representative choice for the weights is:
1, 1, . . . , 1, 0
This set of weights shows all points in the directional activity neighborhood getting a weigh of one except the most distant pixel which gets a weight of zero. It is understood that other weight assignments are possible.

Block 42 in FIG. 3 depicts the filtration of weighted chrominance values. For each chrominance data plane, the weighted chrominance values from Block 42 are sorted by size. The highest and lowest values are discarded and the remaining chrominance values, together with the sums of their weights, are passed to Block 44. If there are fewer than three non-empty directional neighborhoods, the filtration process will pass no filtered chrominance values at all. The filtration process is done separately for each chrominance data plane.

Finally, Block 44 of FIG. 3 depicts the combination of pixel chrominances with the filtered chrominance values from Block 42. The filtered chrominance values are weighted by their individual sum of weights and combined with the selected pixel's chrominance value with a weight of unity. The result is a noise-cleaned low frequency chrominance value for the selected pixel. This process is done separately for both chrominance data planes. If there no filtered chrominance values are passed in from Block 42, then no change is made to the chrominance values at the selected pixel.

It will be understood by one skilled in the art that the present invention can be used as part of a digital image processing chain and that it can be put in sequence with other image processing steps.

The invention has been described in detail with particular reference to certain preferred embodiments thereof, but it will be understood that variations and modifications can be effected within the spirit and scope of the invention.

Parts List
10 block depicting computation of luminance values
12 block depicting computation of chrominance values
14 block depicting computation of neighborhood of pixels
16 block depicting computation of low frequency chrominance
18 block depicting production of noise-cleaned low frequency chrominance signals
20 block depicting upsampling of noise-cleaned chrominance values
22 block depicting conversion of luminance and noise-cleaned chrominances
30 block depicting computation of activity values
32 block depicting computation of low frequency activity vectors
34 block depicting computation of directional low frequency activity neighborhoods
36 block depicting computation of low frequency activity neighborhoods
40 block depicting the computation of weighted chrominance values
42 block depicting filtration of weighted chrominance values
44 block depicting combination of pixel chrominances with filtered chrominance values from Block 42

What is claimed is:

1. A method of minimizing color aliasing artifacts from a color digital image having color pixels comprising the steps of:

(a) providing luminance and chrominance signals from the color digital image;

(b) using the luminance and chrominance signals to compute neighborhoods of pixels which are to be processed and wherein such neighborhoods of pixels substantially are bounded by pixels defining edges;

(c) producing low frequency chrominance signals in response to the chrominance signals;

(d) using the low frequency chrominance signals and the computed neighborhood of pixels to produce noise-cleaned chrominance signals;

(e) upsampling the noise-cleaned chrominance signals to produce upsampled noise-cleaned chrominance signals; and (f) using the luminance signals and the upsampled noise-cleaned chrominance signals to provide a color digital image having reduced color aliasing artifacts.

2. The method of claim 1 wherein step (a) is accomplished a plurality of times to produce the reduced resolution color digital image.

3. The method of claim 1 wherein the color pixels in a neighborhood of pixels are selected so that color pixels to be averaged do not extend over and beyond an adjacent edge.

4. In a method for image processing, a color digital image and which includes minimizing color aliasing artifacts from a processed color digital image comprising the steps of:

(a) image processing an input color digital image to produce a new color digital image having a modified representation than the input color digital image;

(b) reducing the number of color pixels in the input color digital image or the new color digital image to provide at least one lower resolution color digital image;

(c) converting the lower resolution color digital image into a space having luminance and chrominance content;

(d) reducing aliasing artifacts in the chrominance content of the lower resolution color digital image by averaging chrominance values in a neighborhood of a color pixel of interest, wherein the color pixels averaged adjacent the color pixel of interest is related to the distance from an adjacent edge in the color digital image;

(e) interpolating the aliasing reduced chrominance content to a higher resolution; and (f) using the original luminance content and the interpolated chrominance content to provide a color digital image which is either the input color digital image or the new color digital image so that the processed digital image has minimized color aliasing artifacts.

* * * * *